(No Model.) 3 Sheets—Sheet 1.
W. P. POWERS.
TEMPERATURE CONTROLLING APPARATUS.
No. 554,398. Patented Feb. 11, 1896.
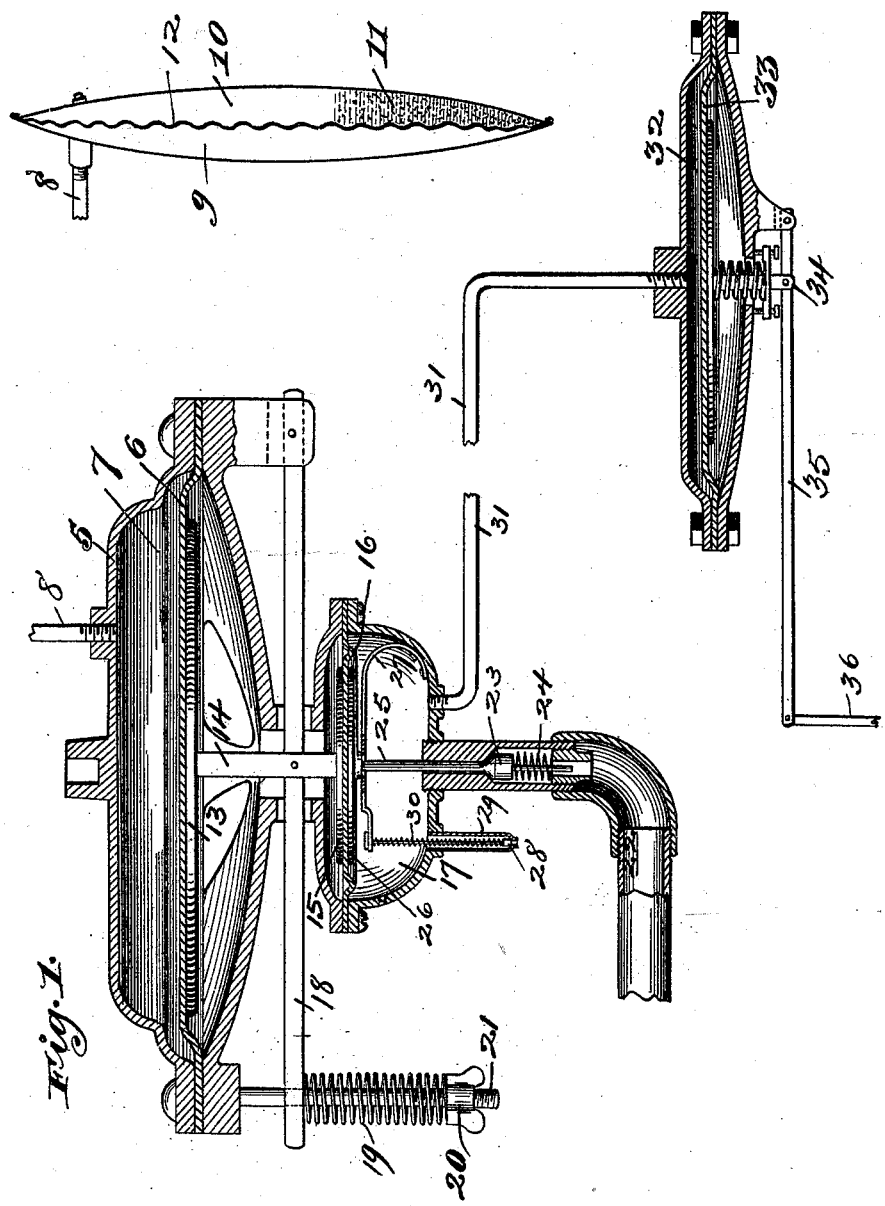

(No Model.) 3 Sheets—Sheet 2.
W. P. POWERS.
TEMPERATURE CONTROLLING APPARATUS.
No. 554,398. Patented Feb. 11, 1896.
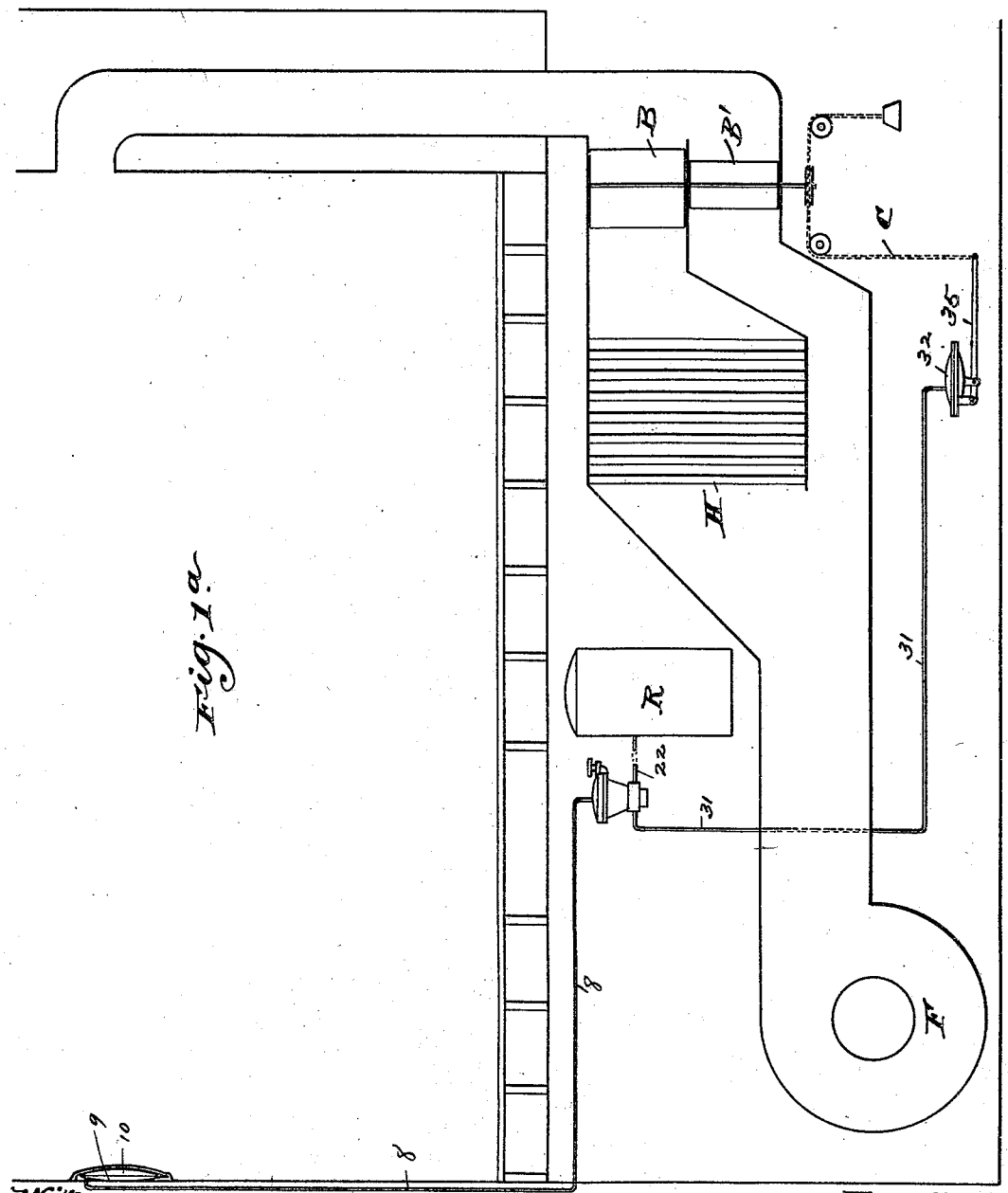

(No Model.) 3 Sheets—Sheet 3.
W. P. POWERS.
TEMPERATURE CONTROLLING APPARATUS.
No. 554,398. Patented Feb. 11, 1896.
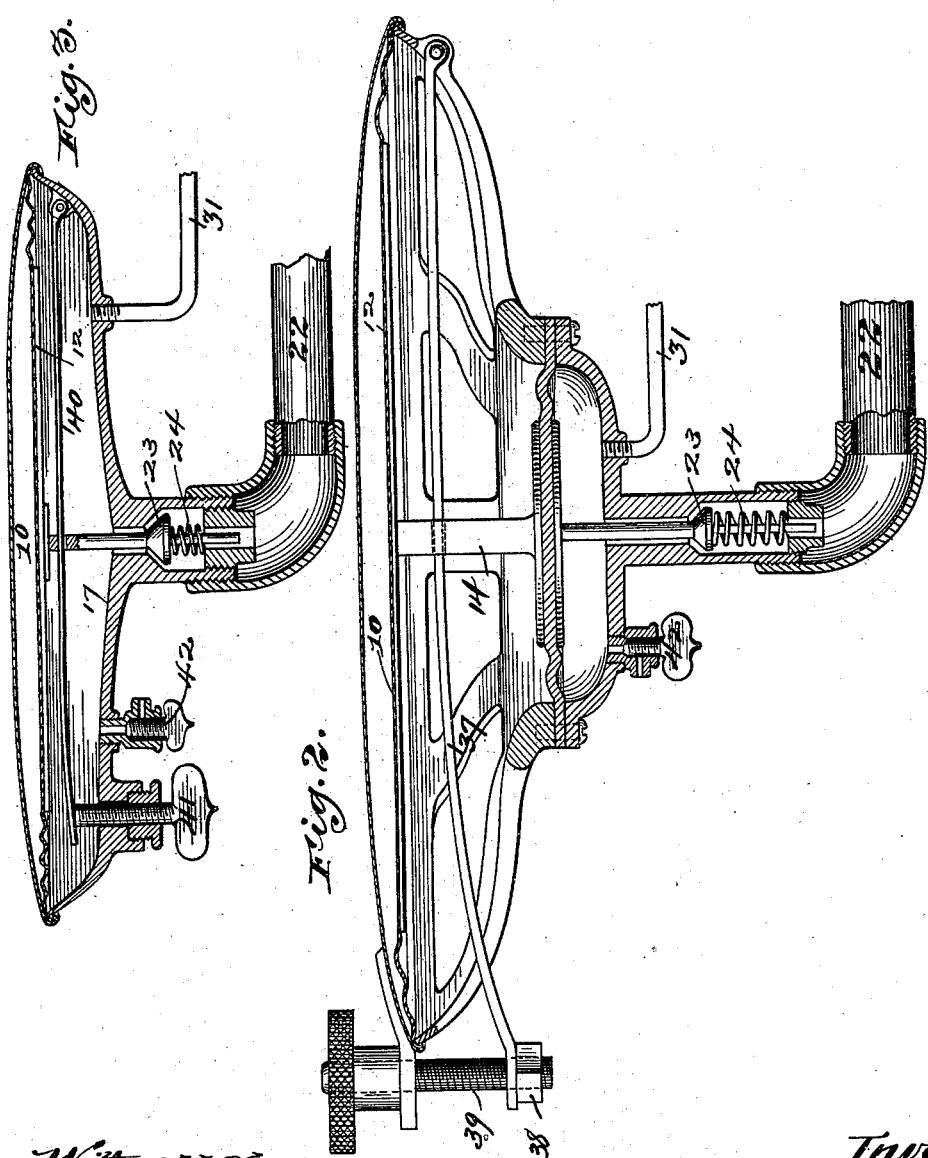
Witnesses,
Inventor;
William P. Powers
By Offield, Towle & Linthicum
Attys.

UNITED STATES PATENT OFFICE.

WILLIAM P. POWERS, OF CHICAGO, ILLINOIS.

TEMPERATURE-CONTROLLING APPARATUS.

SPECIFICATION forming part of Letters Patent No. 554,398, dated February 11, 1896.

Application filed May 10, 1895. Serial No. 548,803. (No model.)

*To all whom it may concern:*

Be it known that I, WILLIAM P. POWERS, of Chicago, Illinois, have invented certain new and useful Improvements in Temperature-Controlling Apparatus, of which the following is a specification.

This invention relates to that class of temperature-controlling apparatus in which a pressure-thermostat is employed to control the valves or dampers which regulate the amount of heat supplied.

A thermostat operating within the general principle above stated is shown in my Patent No. 416,947, of December 10, 1889. The thermostat described in said patent operates by the volatilization of a fluid contained in one chamber of the thermostat to flex a diaphragm and compress a body of air or other fluid contained in the other chamber, which pressure is transmitted through a pipe leading to a pressure-chamber having a flexible diaphragm, the movement of which is made to open or close a damper, valve or other means for regulating the supply of heat.

It is the purpose of the present invention to provide means whereby the power of a thermostat operating upon the principle above described is increased or supplemented. By means of the present invention I secure an increase in the volume of the fluid medium by which the damper or valve is actuated, and this increase in volume may be accompanied by an increase in the pressure of the fluid medium.

In order to attain the objects above stated, there is employed what is technically known as a "reducing-valve" or its equivalent, said valve controlling the admission of a supplemental pressure fluid and being operated either directly or indirectly by means of a diaphragm flexed by the action of a volatile fluid, vaporizing at about the temperature desired to be secured, instead of an adjustable spring, as is usually the case.

In carrying out my invention I employ a chamber to contain the volatile fluid, said chamber having a movable wall, and said wall being adapted by its movement in one direction to unseat a valve controlling the passage for a fluid under pressure and permitting the valve to return to its seat in the return movement of said movable wall. Such fluid under pressure may be steam, air, or water, and when permitted to pass the valve it enters a chamber wherein its pressure operates on the diaphragm in opposition to the thermostatic pressure to permit the return of the valve to its seat, and from which it may be conveyed to a motor or pressure device for operating a valve or damper. An escape-aperture is provided to return the excess of pressure and restore an equilibrium, and this escape-aperture may be either independent of or under the control of the thermostat.

By this improvement the thermostatic action controls the movements of a valve and the latter controls the admission of a fluid under pressure, the resulting pressure being proportionate to that afforded by the thermostat, thereby securing additional power for the operation of the motor which controls the valve or damper regulating the heat supply. The thermostat as heretofore employed by me has only a limited power and movement, and by the present improvement it may be reinforced or supplemented by arranging it to control the supply of a fluid under greater pressure, which will be effective in situations where the thermostat alone might be insufficient.

If it be desired to secure a greater pressure as well as an additional volume of motor fluid, this may be accomplished by the employment of two connected diaphragms of different areas, one being subjected to the pressure of the volatile liquid or of an air column moved thereby, and the other and smaller diaphragm being subjected to the supplemental fluid-pressure, the smaller diaphragm being made in this case to operate the valve, whereby the flow of the pressure fluid is controlled. In this case the chamber into which the pressure fluid is admitted is in communication with the motor, as before, and the motor fluid, being under greater pressure, is capable of performing more work.

From the foregoing it will be understood that my invention may be embodied in more than one form of mechanism, and I have therefore shown in the accompanying drawings a preferred form and modifications thereof, all of which embody the essential principle of the invention.

In the accompanying drawings, Figure 1ª is a diagrammatic view showing the application of one form of my invention to practical use. Fig. 1 is a sectional elevation, parts broken away and parts in elevation, showing a form of the apparatus wherein a separate thermostat, two pressure-chambers having their diaphragms connected, and a fluid-pressure motor are employed. Fig. 2 is a similar view showing a modification wherein the thermostat has its flexible wall connected with a diaphragm by which the pressure-fluid-supply opening is controlled. Fig. 3 shows a modification wherein the pressure-fluid-supply valve is operated directly by the movement of the flexible wall or diaphragm of the thermostat.

Referring first to Fig. 1, 5 represents a shell or casing having a diaphragm 6 and providing a chamber 7, which is connected, as by the pipe 8, with the chamber 9 of the thermostat. The chamber 7, pipe 8 and chamber 9 intercommunicate and contain a freely-moving body of air or other fluid. The thermostat has a second chamber, 10, which contains a body 11 of a volatile fluid, the chambers 9 and 10 being separated by the flexible diaphragm 12. Any variation of the temperature will effect a change of pressure in the chamber 10 and a movement of the diaphragm 12, thus causing a movement of the fluid column in pipe 8 and varying the pressure in the chamber 7. A piston-plate 13 rests upon the under side of the diaphragm 6, and a standard 14 rigidly connects said piston-plate with a piston-plate 15, which rests upon a diaphragm 16 covering one side of a pressure-chamber 17.

As shown in Fig. 1, the diaphragm 6 is supported by an open shell having a hollow neck connected with a second shell resting upon the upper edge of the diaphragm 16; but it will be understood that this is only a convenient means of connecting the two pressure-chambers and that these shells may be omitted and other convenient means of connecting the parts substituted. A lever 18, pivoted at one extremity, is pivoted between its ends to the standard 14 and its extremity opposite its pivot is seated upon a regulating-spring 19, the tension of which may be varied by a thumb-nut 20 working upon the threaded rod 21. The chamber 17 is a supplemental pressure-fluid chamber and is in communication with any suitable source of supply of pressure fluid—as, for example, compressed air, steam, or water. The fluid-supply pipe is shown at 22, and the inlet from said pipe is controlled by a valve 23, which, together with the diaphragm and the pressure above it, operates as a reducing-valve. Said valve rests upon a spring 24, and it has an upwardly-projecting stem 25, which rests directly upon the lower side of a piston-plate 26 secured to the diaphragm 16.

As shown in Fig. 1, a bow-spring 27 is arranged to bear against the piston-plate 26 and is provided with an aperture through which passes the end of the valve-stem 25, and said spring has its free end connected with the stem of a small escape-valve 28, closing an aperture in the lower end of the depending escape-pipe 29. A spring 30 insures the proper seating of the escape-valve when left free to act. The chamber 17 is in communication through a pipe 31 leading to a pressure-chamber 32, having a diaphragm 33 provided with a piston 34, connected with a pivoted lever 35 and depending link 36, which will be understood to be connected with a valve or damper controlling the supply of heat.

Briefly stated, the operation of this form of the device is as follows: The thermostat affords at a certain increase in temperature a definite pressure upon the diaphragm 6 and forces it downward. The downward movement of the diaphragm is transmitted through the rigidly-connected piston-plates 13 and 15 to the diaphragm 16, and the movement of said diaphragm, acting through the piston-plate 26 and valve-stem 25, causes the valve 23 to open, admitting fluid-pressure from the supplemental-pressure supply until sufficient pressure is developed beneath the diaphragm 16 to overcome the downward pressure of the thermostat. This results in an upward movement of the diaphragm and a consequent closing of the valve 23. Inasmuch as the area of the diaphragm 16 is less than that of the diaphragm 6, it follows that a greater increase of pressure per square inch will be required in the chamber 17 than that which is produced in the chamber 7 by any increase of temperature. Thus if the diaphragm 6 has an area four times that of the diaphragm 16 it is evident that four times the pressure will be required in chamber 17 to maintain the equilibrium, and it is evident that for every pound of pressure gained by the thermostat four pounds will be required in the smaller chamber to maintain the equilibrium. The fluid-pressure in the chamber 17 is also exerted in the pressure-chamber of the motor above the diaphragm 33 and, moving said diaphragm, acts upon the lever 35 and link 36 to diminish the supply of heat.

If the temperature at the thermostat falls the pressure on the diaphragm 6 is lessened, and an upward movement of the diaphragms 6 and 16 results, allowing the spring 27 to open the valve 28, which results in an escape of a definite proportion of the pressure in the chamber 17 and in restoring the equilibrium between the upper and lower chambers. It is evident that the pressure in chamber 17 will at all times be a multiple of that existing in chamber 7. The degree of pressure at which the valve 23 will open may be regulated by the thumb-nut 20 and the spring 19 which bears against the free end of the lever 18. Any downward movement of the diaphragm 6 will be communicated through the standard 14 to the lever 18 and result in a compression of the spring 19, and the greater the tension on said spring the greater pressure will be required to open the valve 23.

Referring now to the modified construction shown in Figs. 2 and 3, I may, as shown in said figures, dispense with the intermediate chamber and the pipe 8 and utilize the movement of the diaphragm of the thermostat either directly or indirectly to open the valve.

As shown in Fig. 2, the thermostat is arranged so that its movable wall or diaphragm imparts motion directly to the diaphragm of the supplemental pressure-chamber and through the latter unseats the valve.

As shown in Fig. 3, the second diaphragm is omitted and the supplemental pressure-chamber is separated from the thermostat-chamber by the diaphragm of the thermostat; or, stated in another way, the thermostat is directly connected with the valve and the air-chamber of the thermostat becomes the supplemental pressure-chamber.

As shown in Fig. 2, the lever 18, spring 27, and escape-valve 28 are omitted, and a spring 37 is shown connected with the standard 14 and provided with an adjusting-nut 38 working on the threaded bolt 39.

In Fig. 3 a spring 40 is connected directly with the valve-stem, its free end resting on the adjusting-screw 41. A manually-operated petcock 42 is shown in Figs. 2 and 3, which will be so adjusted as to permit the excess of pressure in the lower chamber to leak out gradually, and a similar provision may be made in the supplemental pressure-chamber of the device shown in Fig. 3. This escape-aperture may be arranged in some other part of the system to which the supplemental pressure fluid has access.

The operation of the apparatus shown in Figs. 2 and 3 is substantially the same as that shown in Fig. 1. The thermostatic action causes the unseating of the valve and admits the supplemental pressure fluid which is utilized in a suitable pressure-fluid motor to operate a valve or damper, and when such pressure takes place as will overcome the thermostat-pressure the diaphragm of the thermostat will be raised and the valve will be seated, the excess of pressure in the chamber being allowed to escape when the temperature falls until the equilibrium is restored.

In Fig. 1ª I have shown one application of my invention to practical work and have marked the several parts to correspond with the reference-numerals applied to the corresponding parts in Fig. 1. I have shown a reservoir for compressed air at R, a fan at F, a heater at H, and dampers at B B', these dampers being controlled by the chain C from the pressure device marked 32, the operating-lever 35 being shown connected to the chain C instead of being provided with the depending link, as shown in said Fig. 1. In Fig. 1ª a single compartment is shown, the thermostat being located upon a wall therein and the heating apparatus, which is controlled by the thermostat, being located in a sub-story, the heating medium being hot air.

I am enabled by this device not only to obtain a direct increase of pressure, but also an unlimited quantity of the moving force, so that I am able to employ a pressure-chamber of any size required to do the necessary work. By means of this invention I am enabled to multiply indefinitely the power of the thermostat, while at the same time preserving its characteristic action, and thus control dampers or valves with a gradual motion depending upon changes of temperature. By its use I am enabled to handle dampers or valves effectually that could not be handled to advantage by the thermostat direct because of its low efficiency, and my invention may be characterized as an auxiliary or supplemental device for increasing and adding to the power of the pressure-thermostat described in my patent above identified. The upper and lower diaphragms may be of equal size. In that case no additional pressure could be obtained, but a large increase in volume of the pressure fluid will be secured, thus permitting the use of a large pressure-chamber or a motor of large displacement.

My invention is not limited to the precise structural details, my purpose being to use any combination of parts in which a volatile-liquid thermostat controls either directly or indirectly a supplemental fluid-supply opening and whereby the resulting pressure is determined and controlled by the variations of pressure of the volatile liquid at different temperatures, the object being to secure additional pressure or volume or both, as the case may be, the thermostat directing and controlling the variations in pressure and the supplemental pressure fluid effecting the results under such thermostatic direction. Neither is my invention limited to the use of a volatile-liquid thermostat, as it may be found expedient and desirable to substitute therefor another form of thermostat affording pressure.

I claim—

1. In a temperature-controlling apparatus, the combination with a pressure-thermostat, of a movable diaphragm, a pressure-chamber having an independent and supplemental pressure-fluid supply, a valve controlling said supply, said valve being adapted to be opened by the thermostatic pressure whereby to admit the supplemental pressure fluid to act on the diaphragm in opposition to the thermostatic pressure, substantially as and for the purpose described.

2. In a temperature-controlling apparatus a fluid-pressure thermostat having a movable diaphragm adapted to be flexed by the thermostatic pressure, a regulating-spring resisting the movement of the diaphragm under said pressure, a supplemental pressure-fluid supply, a valve controlling said supply and adapted to be operated by the movement of the diaphragm, and means for adjusting the regulating-spring and thereby the tension of the diaphragm whereby the thermostat may be made to actuate the valve at any desired pressure, substantially as described.

3. In a temperature-controlling apparatus, the combination with a pressure thermostat, of a movable diaphragm adapted to be flexed by the thermostatic pressure, a supplemental pressure-chamber, a pressure-fluid supply communicating with said chamber and opposing the thermostatic pressure, a valve for controlling the pressure-fluid supply, and intermediate mechanism between the diaphragm and the valve whereby the variations of temperature may be made to control the valve, substantially as described.

4. In a temperature-controlling apparatus, the combination with a thermostat having a movable diaphragm or wall, a supplemental pressure-chamber having also a movable diaphragm, a pressure-fluid supply communicating with said supplemental pressure-chamber, a valve controlling its inlet and a conduit leading from the supplemental pressure-chamber whereby the motor fluid may be conveyed away for utilization, and an escape-opening whereby the excess of pressure may be relieved, substantially as described.

5. In a temperature-controlling apparatus, the combination with a thermostat of two pressure-chambers each having a movable diaphragm, one of said chambers being larger than the other, the larger of said chambers being adapted to serve as a pressure-chamber for a thermostat and the smaller chamber as a supplemental fluid-pressure chamber, an independent pressure-fluid supply communicating with the smaller chamber, a valve controlling the pressure-fluid-supply inlet and connections between the diaphragms whereby the thermostatic action may be made to unseat the valve and admit the pressure-fluid supply to the smaller chamber, substantially as described.

6. In a temperature-controlling apparatus, the combination with a thermostat of two pressure-chambers each having a movable diaphragm, one of said chambers being larger than the other, the larger of said chambers being adapted to serve as a pressure-chamber for a thermostat and the smaller chamber as a supplemental fluid-pressure chamber, an independent pressure-fluid supply communicating with the smaller chamber, a valve controlling the pressure-fluid-supply inlet, connections between the diaphragms whereby the thermostatic action may be made to unseat the valve and admit the pressure-fluid supply to the smaller chamber, and a valve controlled by the thermostat to relieve the excess of pressure, substantially as described.

7. In a temperature-controlling apparatus, the combination with a thermostat of two pressure-chambers each having a movable diaphragm, one of said chambers being larger than the other, the larger of said chambers being adapted to serve as a pressure-chamber for a thermostat and the smaller as a supplemental pressure-fluid chamber, an independent pressure-fluid supply communicating with the smaller chamber, a valve controlling the pressure-fluid-supply inlet, connections between the diaphragms whereby the thermostatic action may be made to unseat the valve and admit the pressure-fluid supply to the smaller chamber, and a regulating-spring for adjusting the mechanism to operate under varying pressures, substantially as described.

WILLIAM P. POWERS.

Witnesses:
FREDERICK C. GOODWIN,
N. M. BOND.